March 23, 1965     T. T. CAGLE     3,174,808
ANTICREEP DEVICE FOR A VEHICLE
Filed April 25, 1963
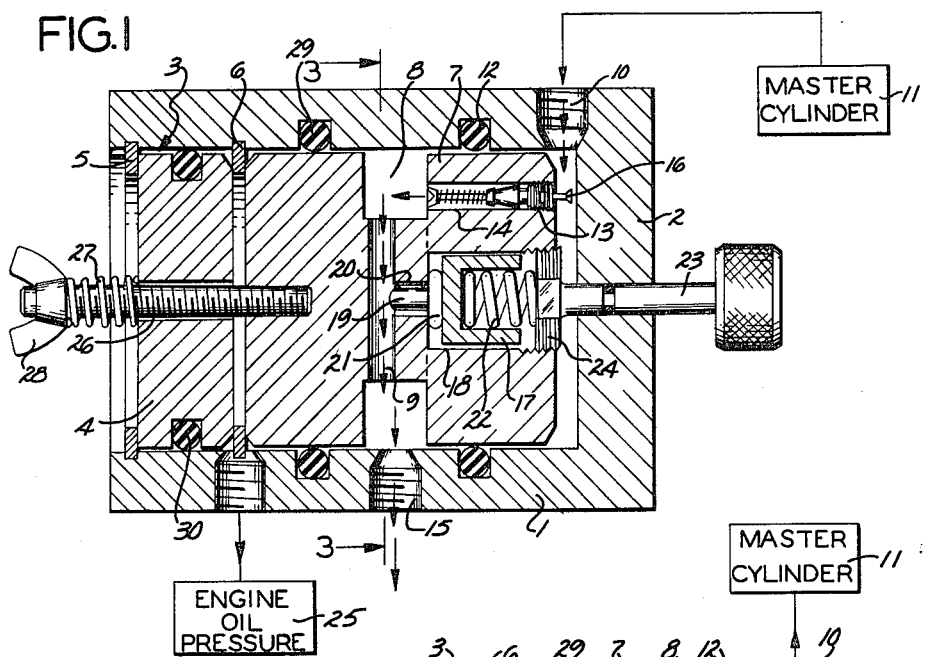
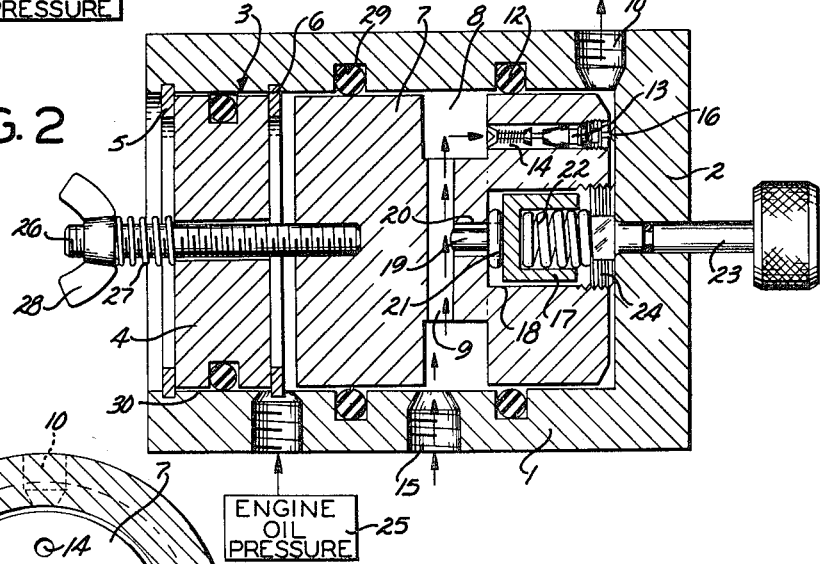
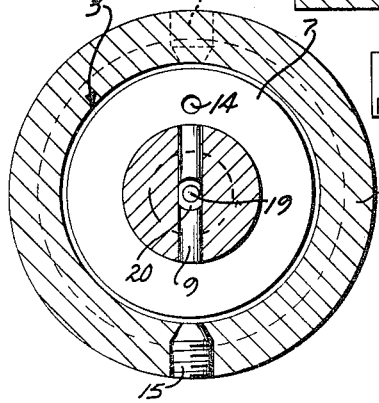
INVENTOR.
TOBY T. CAGLE
BY
ATTORNEY 3,174,808
ANTICREEP DEVICE FOR A VEHICLE
Toby T. Cagle, Bellflower, Calif., assignor of fifty-two percent to W. Grant Kilbourne, Pocatello, Idaho
Filed Apr. 25, 1963, Ser. No. 275,615
9 Claims. (Cl. 303—18)

This invention relates to an anticreep device for a vehicle, and particularly for a vehicle with an automatic transmission, to prevent the vehicle from moving forward at slow speed when the engine is idling or revolving at relatively slow speeds.

An object of my invention is to provide an attachment which is mounted between the master cylinder and the vehicle brakes to retain a fixed amount of pressure in the brake lines, so that the brakes are held in contact with the brake drums with a predetermined pressure, thus preventing creeping or slow movement of the vehicle.

Another object of my invention is to provide an anticreep device of the character described which will be automatically released to permit free movement of the vehicle without a brake drag as soon as the engine is accelerated.

Another object of my invention is to provide an anticreep device to the character described, in which the amount of retained pressure on the brakes after release of the brake pedal can be adjusted as required by the particular vehicle to which the device is applied.

A feature of my invention resides in the novel means to release all pressure back to the master brake cylinder as soon as the vehicle engine is accelerated.

Other objects, advantages and features of invention may appear from the accompanying drawing, the subjoined detailed description and the appended claims.

In the drawing:

FIGURE 1 is a vertical sectional view of my anticreep device with the parts in one position.

FIGURE 2 is a vertical sectional view of my anticreep device showing the parts in another position.

FIGURE 3 is a sectional view taken on line 3—3 of FIGURE 1.

Referring more particularly to the drawing, the numeral 1 indicates the outer housing which is closed on one side by the wall 2. The housing 1 is formed with a cylinder bore 3 which is open at one end. The other end of the cylinder is closed by the wall 2 as shown. A plug 4 incloses the open end of the bore 3 and is held against movement within the bore by the two snap rings 5 and 6. These snap rings both fit in appropriate grooves in the body 1 and are tensioned to hold their positions so that the plug 4 is held securely in place, and also may be removed when necessary to repair interior parts. A piston 7 is slidably mounted within the bore 3 and is formed with an annular groove 8 approximately midway therein, so that fluid may circulate in this groove, as will be subsequently described. A transverse bore 9 is formed in the reduced neck portion of the piston 7, again to permit fluid circulation, as will be subsequently described. A fluid intake port 10 extends through the wall of the housing 1 and into the bore 3 at the inner end of the piston 7. An appropriate pipe extends from the master cylinder 11 to the port 10 so that when pressure is exerted by the brake pedal in the master cylinder, fluid under pressure will be forced into the housing 1 and against the inner end of the piston 7. An appropriate packing ring 12 seals the inner end of the piston 7 and prevents leakage at this point. A spring valve 13, of the type commonly used in pneumatic tires and known as a "Schrader" valve, is positioned in a valve bore 14 which extends from the inner end of the piston 7 and thence into the annular groove 8. A fluid outlet port 15 extends from the bore 3 of the housing, and is approximately aligned with the annular groove 8, and this port is connected to the vehicle brakes in the usual and well known manner for the purpose of hydraulically actuating these brakes. Fluid flows in both directions, both to and from the brakes through the port 15, depending on whether the pressure is being applied on the brake pedal by the operator, or whether the springs in the brakes are withdrawing the brake shoes from contact with the brake drums, in which case the fluid flows back through the port 15 and thence into the groove 8. When pressure is applied to the brake pedal fluid will flow from the master cylinder under a pressure of about 400 pounds per square inch, more or less, into the port 10 and thence into the space at the inner end of the piston 7, where the spring valve 13 permits fluid to flow through the port 14, thence into the annular groove 8, then out through the port 15 and thence to the brakes. The position of the parts for this operation is shown in FIGURE 1. It will be noted that the release pin 16 of the valve 13 is spaced from the wall 2 of the housing 1, so that fluid can pass through this valve in the direction shown by the arrows in FIGURE 1. The valve 13 is unidirectional, that is, it checks fluid in one direction but permits flow in the opposite direction. By depressing the pin 16 of the valve, however, fluid can flow through it in both directions, but particularly in the direction opposite to the arrows shown in FIGURE 1.

A spring pressed return valve is provided in the piston 7 as follows: A thimble 17 is loosely and slidably mounted within a counterbore 18 in the end of the piston 7. A small diameter pin 19 projects from the thimble 17 through a bore 20 which connects the counterbore 18 and the bore 9. An O-ring or other seal 21 surrounds the pin 19 and bears against the inner end of the counterbore 18 to seal the bore 20 when the thimble 17 is pressed inwardly by the spring 22.

To adjust the tension of the spring 22 I provide a rod 23 which is slidably mounted in the end wall 2 of the housing. A threaded enlargement 24 on the inner end of the rod 23 screws into the inner end of the piston 7 and engages the spring 22 to adjust the tension of that spring against the thimble 17. The opposite sides of the enlargements 24 are flattened to permit fluid to bypass this enlargement on the return flow of the fluid from the brakes to the master cylinder.

To permit remaining fluid under pressure to flow back from the brakes and into the master cylinder, I provide a means of tripping or releasing the pin 16 of the valve 13 by moving the piston 7 inwardly towards the wall 2. This is accomplished by the engine oil pressure pump 25 which increases its pressure as the engine is accelerated, and this increased engine oil pressure will be exerted against the outer face of the piston 7 and behind the plug 4 to press the piston 7 inwardly until the pin 16 engages the wall 2 and opens the valve 13. The position of the parts for this function is shown in FIGURE 2. An adjustable spring tensioning is provided to control the movement of the piston 7 by the engine oil pressure as follows: A stud 26 projects from the piston 7 through the plug 4. A coil spring 27 surrounds this stud and is tensioned by the wing nut 28. By adjusting the tension of the spring 27 it is possible to delay movement of the piston 7 until engine oil pressure has built up to a predetermined amount. To seal the outer end of the piston 7 a second packing ring 29 is provided in the housing 1, and also to seal off the plug 4 an appropriate packing 30 is provided on this member.

*In operation*

When the vehicle brakes are applied the engine decelerates and the engine oil pressure drops to a minimum. The spring 27 will, therefore, draw the piston 7 to the position shown in FIGURE 1, and where the inner end of this piston is spaced from the wall 2. Brake fluid now passes from the master cylinder as the brake is applied under a pressure of about 400 pounds per square inch, more or less. This brake fluid passes through the valve 13 and its bore 14 into the groove 8, and thence through the port 15 to the various vehicle brakes. The spring 22 has been previously adjusted by means of the rod 23 so that the thimble 17 will be pressed against the inner end of its counterbore 18, with an appropriate pressure to withstand back pressure of only about 100 pounds per square inch; that is, when the brake pedal is released the brake shoes and their springs will push fluid back into the groove 8, thence through the bore 9 and into the bore 20, to depress the thimble 17 against the tension of the spring 22 and permitting fluid to drain back into the master cylinder until only about 100 pounds pressure remains in the brakes. That is, when pressure in the brakes drops to about 100 pounds, more or less, the spring 22 will again press the seal 21 against the bottom of the counterbore 18 and prevent further return of fluid to the master cylinder. This reduced pressure in the brakes will prevent creeping of the vehicle, due to the natural drag in an automatic transmission.

When the engine is again accelerated, engine oil pressure builds up rapidly and this pressure is exerted against the outer face of the piston 7, moving that piston to the position shown in FIGURE 2 and against the tension of the spring 27. When the pin 16 strikes the wall 2 that remaining pressure in the brakes is returned to the master cylinder through the valve 13 in the direction shown by the arrows in FIGURE 2. The brakes are now completely released and the vehicle moves forward in the usual manner.

Having described my invention, I claim:

1. An anticreep device for a vehicle having a brake master cylinder and brakes thereon comprising,
a housing,
said housing having an intake port therein connected to the master cylinder and an outlet port therein connected to the brakes,
a piston slidably mounted in the housing,
a dual directional check valve in said piston,
and means engageable by the check valve to reverse flow therethrough,
said intake and outlet ports being positioned adjacent opposite faces of said piston,
said piston having a counterbore therein, and a port extending from the counterbore to the side of the piston adjacent the outlet port,
a thimble in said counterbore,
spring means engaging the thimble,
and packing means on the thimble engaging the port extending from the counterbore in one position of the parts.

2. An anticreep device for a vehicle having a brake master cylinder and brakes thereon comprising,
a housing,
said housing having an intake port therein connected to the master cylinder and an outlet port therein connected to the brakes,
a piston slidably mounted in the housing,
a dual directional check valve is said piston,
a release pin in said check valve,
said release pin engaging a wall in the housing to reverse direction of flow through said valve,
said intake and outlet ports being positioned adjacent opposite faces of said piston,
said piston having a counterbore therein, and a port extending from the counterbore to the side of the piston adjacent to the outlet port,
a thimble in said counterbore,
spring means engaging the thimble,
and packing means on the thimble engaging the port extending from the counterbore in one position of the parts.

3. An anticreep device for a vehicle having a brake master cylinder and brakes thereon comprising,
a housing,
said housing having an intake port therein connected to the master cylinder and an outlet port therein connected to the brakes,
a piston slidably mounted in the housing,
a dual directional check valve in said piston,
means engageable by the check valve to reverse flow therethrough,
said intake and outlet ports being positioned adjacent opposite faces of said piston,
said piston having a counterbore therein, and a port extending from the counterbore to the side of the piston adjacent the outlet port,
a thimble in said counterbore,
spring means engaging the thimble,
packing means on the thimble engaging the port extending from the counterbore in one position of the parts,
and manually operable means engaging the spring means to vary the tension of the spring means.

4. An anticreep device for a vehicle having a brake master cylinder and brakes thereon comprising,
a housing,
said housing having an intake port therein connected to the master cylinder and an outlet port therein connected to the brakes,
a piston slidably mounted in the housing,
a dual directional check valve in said piston,
a release pin in said check valve,
said release pin engaging a wall in the housing to reverse direction of flow through said valve,
said intake and outlet ports being positioned adjacent opposite faces of said piston,
said piston having a counterbore therein, and a port extending from the counterbore to the side of the piston adjacent the outlet port,
a thimble in said counterbore,
spring means engaging the thimble,
packing means on the thimble engaging the port extending from the counterbore in one position of the parts,
and manually operable means engaging the spring means to vary the tension of the spring means.

5. An anticreep device for a vehicle having a brake master cylinder and brakes thereon comprising,
a housing,
said housing having an intake port therein connected to the master cylinder and an outlet port therein connected to the brakes,
a piston slidably mounted in the housing,
a dual directional check valve in said piston,
means engageable by the check valve to reverse flow therethrough,
said intake and outlet ports being positioned adjacent opposite faces of said piston,
said piston having a counterbore therein, and a port extending from the counterbore to the side of the piston adjacent the outlet port,
a thimble in said counterbore,
spring means engaging the thimble,
packing means on the thimble engaging the port extending from the counterbore in one position of the parts,
a third port in said housing connected to the engine oil pump, said third port being positioned adjacent a side of the piston opposite the intake port and spaced from the outlet port to exert engine oil pressure against one side of the piston.

6. An anticreep device for a vehicle having a brake master cylinder and brakes thereon comprising,
a housing, said housing having an intake port therein connected to the master cylinder and an outlet port therein connected to the brakes,
a piston slidably mounted in the housing,
a dual directional check valve in said piston,
a release pin in said check valve,
said release pin engaging a wall in the housing to reverse direction of flow though said valve,
said intake and outlet ports being positioned adjacent opposite faces of said piston,
said piston having a counterbore therein, and a port extending from the counterbore to the side of the piston adjacent the outlet port,
a thimble in said counterbore,
spring means engaging the thimble,
packing means on the thimble engaging the port extending from the counterbore in one position of the parts,
a third port in said housing connected to the engine oil pump, said third port being positioned adjacent a side of the piston opposite the intake port and spaced from the outlet port to exert engine oil pressure against one side of the piston.

7. An anticreep device for a vehicle having a brake master cylinder and brakes thereon comprising,
a housing,
said housing having an intake port therein connected to the master cylinder and an outlet port therein connected to the brakes,
a piston slidably mounted in the housing,
a dual directional check valve in said piston,
means engageable by the check valve to reverse flow therethrough,
said intake and outlet ports being positioned adjacent opposite faces of said piston,
said piston having a ounterbore therein, and a port extending from the counterbore to the side of the piston adjacent the outlet port,
a thimble in said counterbore,
spring means engaging the thimble,
packing means on the thimble engaging the port extending from the counterbore in one position of the parts,
manually operable means engaging the spring means to vary the tension of the spring means,
a third port in said housing connected to the engine oil pump, said third port being positioned adjacent a side of the piston opposite the intake port and spaced from the outlet port to exert engine oil pressure against one side of the piston.

8. An anticreep device for a vehicle having a brake master cylinder and brakes thereon comprising,
a housing,
said housing having an intake port therein connected to the master cylinder and an outlet port therein connected to the brakes,
a piston slidably mounted in the housing,
a dual directional check valve in said piston,
a release pin in said check valve,
said release pin engaging a wall in the housing to reverse direction of flow through said valve,
said intake and outlet ports being positioned adjacent opposite faces of said piston,
said piston having a counterbore therein, and a port extending from the counterbore to the side of the piston adjacent the outlet port,
a thimble in said counterbore,
spring means engaging the thimble,
packing means on the thimble engaging the port extending from the counterbore in one position of the parts,
manually operable means engaging the spring means to vary the tension of the spring means,
a third port in said housing connected to the engine oil pump, said third port being positioned adjacent a side of the piston opposite the intake port and spaced from the outlet port to exert engine oil pressure against one side of the piston.

9. An anticreep device for a vehicle having a brake master cylinder and brakes thereon comprising,
a housing,
said housing having an intake port therein connected to the master cylinder and an outlet port therein connected to the brakes,
a piston slidably mounted in the housing,
a dual directional check valve in said piston,
means engageable by the check valve to reverse flow therethrough,
said intake and outlet ports being positioned adjacent opposite faces of said piston,
said piston having a counterbore therein, and a port extending from the counterbore to the side of the piston adjacent the outlet port,
a thimble in said counterbore,
spring means engaging the thimble,
packing means on the thimble engaging the port extending from the counterbore in one postion of the parts,
a third port in said housing connected to the engine oil pump, said third port being positioned adjacent a side of the piston opposite the intake port and spaced from the outlet port to exert engine oil pressure against one side o fthe piston,
spring means connected to the piston and urging said piston towards said third port.

References Cited by the Examiner
UNITED STATES PATENTS

| | | | |
|---|---|---|---|
| 2,259,810 | 10/41 | Freeman | 192—3 X |
| 2,658,592 | 11/53 | Polomski | 192—3 |
| 2,701,035 | 2/55 | Leichsenring | 188—152.15 |

FERGUS S. MIDDLETON, *Primary Examiner.*